United States Patent [19]

Sing

[11] Patent Number: 4,917,198

[45] Date of Patent: Apr. 17, 1990

[54] SIMULTANEOUS MULTIPLE WEIGHING INVENTORY SYSTEM

[76] Inventor: Peter Sing, 43 Donny Brook Rd., Scarsdale, N.Y. 10583

[21] Appl. No.: 265,921

[22] Filed: Nov. 2, 1988

[51] Int. Cl.[4] .................. G01G 19/42; G01G 5/04; G06F 15/246

[52] U.S. Cl. ................ 177/25.14; 177/208; 364/403

[58] Field of Search ............... 177/25.14, 208, 25.19; 364/403

[56] References Cited

U.S. PATENT DOCUMENTS

| | | | |
|---|---|---|---|
| 4,108,363 | 8/1978 | Susumu | 177/245 X |
| 4,403,680 | 9/1983 | Hillesheimer | 177/146 X |
| 4,419,734 | 12/1983 | Wolfson et al. | 177/25.13 X |
| 4,455,115 | 6/1984 | Alger et al. | 177/147 X |
| 4,657,095 | 4/1987 | Hardin, Jr. et al. | 177/208 X |
| 4,779,690 | 10/1988 | Woodman | 177/208 |

*Primary Examiner*—George H. Miller, Jr.
*Attorney, Agent, or Firm*—Nathaniel Altman

[57] ABSTRACT

Objects to be inventoried are positioned on a series of platforms for weighing. Each platform, which may be a storage shelf, is supported on a piston operating in a fluid pressure cylinder, either hydraulic or pneumatic. On signal from a computer-controller, fluid is pumped through a common conduit into all cylinders simultaneously, steadily increasing the pressure on each cylinder piston. When the pressure reaches the point of balancing the combined weight of any one platform and the objects resting thereon, a signal is generated to report that balancing pressure value to the computer, at the same time causing the corresponding cylinder to be deactivated. Pumping of fluid continues until all platforms in the system have registered balancing pressure values into the computer. With data stored previously in its memory bank, the computer combines the reported pressure values with unit weights of stored objects, piston diameters, tare weights or weigh calibrations to calculate, store, display and/or print out an accurate count of the objects on each platform.

6 Claims, 1 Drawing Sheet

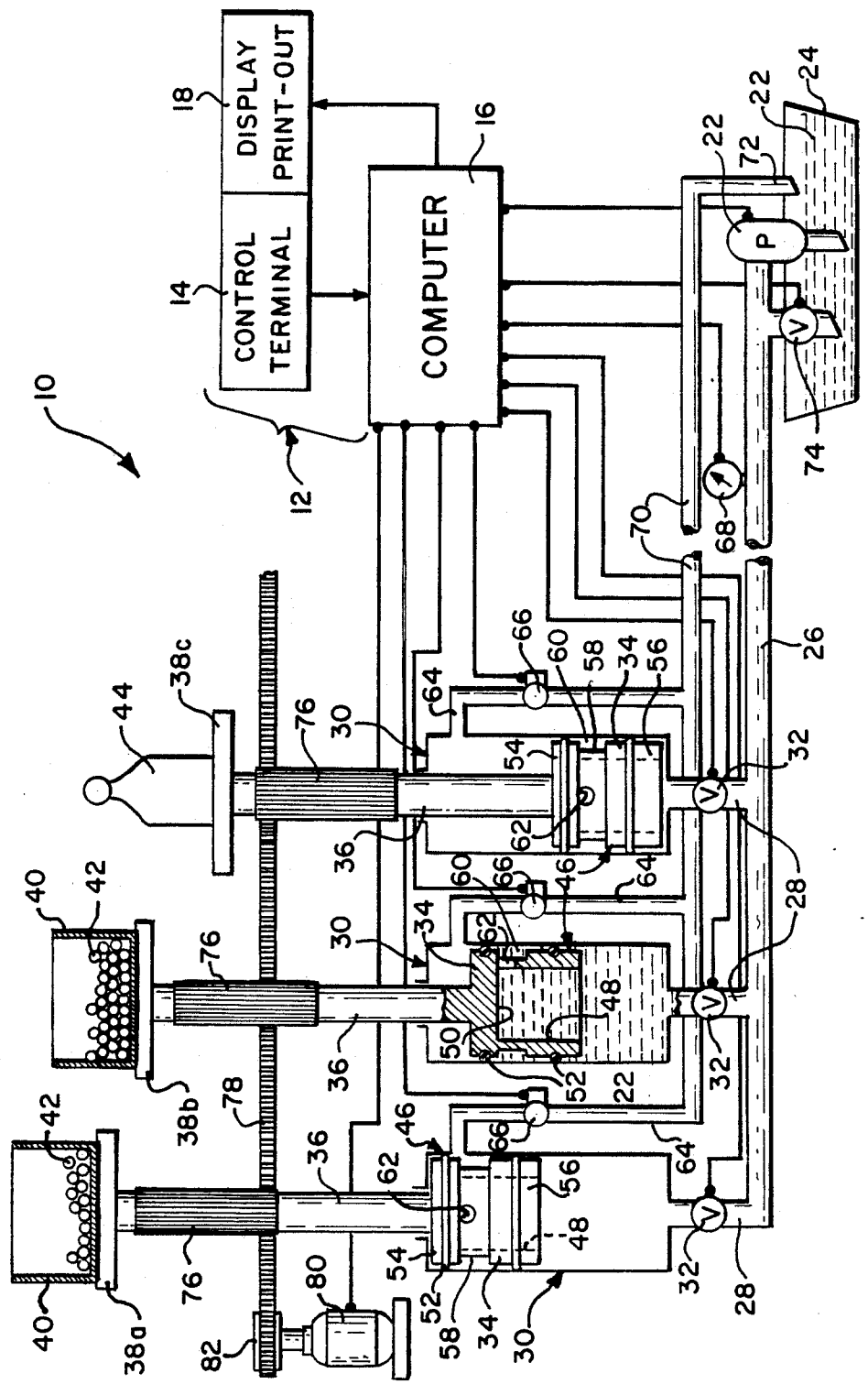

SIMULTANEOUS MULTIPLE WEIGHING INVENTORY SYSTEM

BACKGROUND OF THE INVENTION

Taking inventory of a large number of stored objects in a factory, warehouse or retail outlet is a formidable, time-consuming and therefore expensive task. Conventional past methods of drawer, bin or cabinet storage have required laborious hand-counting or prolonged weighing operations for each group of stored objects. Even with recent prior art improvements in computer-controlled one-at-a-time weighings of stored units (U.S. Pat. No. 4,419,734), inventory-taking remains unsatisfactorily costly in time and equipment. In the case of very small objects, such as electronic and industrial components or jewelry, accurate weighing to provide a meaningful count is essential for an inventory to be of value.

It is therefore the primary object of this invention to provide a system for efficient, rapid and accurate inventory control by the simultaneous but independent weighings of diverse groups of stored objects, the objects in each group being identical to each other. It is also an object of this invention to provide an inventory system of uncomplicated structure with minimum cost of installation, operation and maintenance.

SUMMARY OF THE INVENTION

These objectives are achieved in the system of this invention by storing each group of identical objects on a weighing platform or shelf, each platform being supported independently on the piston of a fluid-pressure-operated cylinder. A series of cylinders are gradually, uniformly and steadily pressurized simultaneously by a single pump forcing fluid through a supply conduit common to all the cylinders. When the increasing pressure on any one cylinder piston reaches a value where the weight of the platform and the objects stored thereon has been matched, the balancing pressure value is reported to a computer-controller and the corresponding cylinder is deactivated. Fluid pumping and increasing pressures continue in the rest of the system until all cylinders have reached balance, have reported to the computer and have been shut down. Previously recorded data on the unit weights of stored objects, piston diameters, tares or weight calibrations in the computer's memory bank are combined with the reported balancing pressure readings by the computer to calculate, store, display and/or print out an accurate count of the objects on each platform being inventoried.

The scope, nature and features of this invention will be more fully understood by consideration of the following detailed description of a preferred embodiment, taken in conjunction with the accompanying drawing and the appended claims.

DRAWING

The single drawing FIGURE is a schematic elevational view, partly in section, of a preferred embodiment of the invention.

DESCRIPTION OF THE PREFERRED EMBODIMENT

The drawing shows a preferred illustrative multiple weighing inventory system, generally designated 10, which is operated and controlled by computer-controller assembly 12. Assembly 12 comprises control terminal 14, computer 16 and display readout or printout 18. Assembly 12 directs the operations of the elements of system 10 as hereinafter described.

A pump 20 draws fluid 22 from reservoir 24 and distributes fluid 22 through manifold 26 and uniformly into branch conduits 28, each of which is connected to, and feeds, a corresponding vertically oriented pressure cylinder 30 through a flow valve 32. While three cylinders 30 are shown in the drawing by way of illustration, it is clearly understood that a far larger number may be arranged and connected to manifold 26 in like manner, and hence all cylinders may be operated simultaneously. It may be noted that while hydraulic pump and cylinders have been shown and described, analagous pneumatic equipment may be substituted therefor.

Fluid 22 is pumped steadily into each cylinder 30 and exerts uniformly increasing upward pressure on each piston 34, thus gradually raising all pistons 34 and their upwardly projecting piston rods 36, which support storage-weighing shelves or platforms 38 and the objects thereon being stored, weighed and inventoried. By way of example, the drawing shows a container 40, holding beads or balls 42 in differing quantities on platforms 38a and 38b, while platform 38c supports standard calibrating weight 44.

Each piston 34 is shaped substantially in the form of an inverted cup, with the peripheral wall 46 of each forming centrally disposed cavity 48 open to the inflowing fluid 22, the pressure of which is exerted principally against top surface 50 of cavity 48. Suitable seals, such as O-rings 52, are provided on pistons 34 to prevent fluid leakage, and are mounted on upper and lower sections 54 and 56, respectively, of wall 46. Between sections 54 and 56, wall area 58 of reduced external diameter creates an annular channel 60, and fluid communication between cavity 48 and channel 60 is maintained through bore 62 in wall 46, The pressure from fluid 22 is steadily increased on each piston 34 in its respective cylinder 30 until the total weight supported thereon (for example, piston rod 36, shelf 38a, container 40 and objects-to-be-inventoried 42) is overcome and piston 34 is forced to rise to the top of cylinder 30. Obviously, the first piston 34 to reach this point carries the lightest load. As this piston rise occurs, channel 60 and bore 62 are brought into registry with cylinder outlet conduit 64, into which fluid 22, under its accumulated pressure, is forced. The fluid pressure impinges on and activates pressure-sensitive sensor 66 in conduit 64 to notify computer 16, which thereupon directs that the following operations be performed: (a) valve 32 is closed: (b) a reading is taken of the balancing pressure shown by gauge 68 on input manifold 26; (c) the balancing pressure reading is combined with data previously stored in computer 16's memory bank, such as effective piston diameter, tare weights of piston, rod, platform and container, calibration, unit weight of objects being inventoried, etc.; and (d) calculates, displays and/or prints out the measured quantity or count of the objects on that particular cylinder-piston-platform assembly.

The specific piston 34 in its respective cylinder 30 described above has been isolated from the rest of the pressurizing system by the closing of valve 32; fluid 22 passes through outlet conduit 64 into return main conduit 70 and is returned to reservoir 24 at main outlet end 72, until the pressure drop created thereby in cylinder 30 causes piston 34 to move downwardly until communication between annular channel 60 and outlet conduit 64 is broken.

At the same time, pump 20 continues to supply fluid under constantly increasing pressure to the remaining cylinders 30, and, as the weight supported on each piston 34 is balanced, each pressure-sensitive sensor 66 is actuated, the balancing pressure value recorded and processed in computer 16, and the corresponding cylinder 30 deactivated. When all cylinders in system 10 have reported their respective balancing pressures, computer 16 stops pump 20, and reopens all valves 32 as well as drain valve 74 in manifold 26, to permit fluid 22 remaining in the cylinders 30 to drain through manifold 26 and valve 74 back into reservoir 24. Valves 34 and 74 are then reclosed and the system 10 restored to its original condition, reach for the next weighing and inventory cycle.

In order to ensure smooth upward movement of pistons 34 during the pressurization-weighing process, piston rods 36 may be provided with pinion gears 76, elongated sufficiently to maintain operative meshing contact with outwardly toothed drive belt 78 throughout the length of piston 34's stroke. Belt 78, positioned to contact and rotate all pistons 34 slowly while they are being forced upwardly, in order to avoid jerky uneven piston movement, is driven by motor 80 through pulley 82. Operation of motor 80 is controlled by computer 16's programmed command during the weighing cycle.

Multiple weighing inventory system 10 is illustrative of the concepts and best mode of practicing the invention now contemplated. It will be apparent to those skilled in the art that substitutions and modifications of elements included therein may be made without departing from the spirit and scope of the invention, which is defined and limited only by the ensuing claims.

What is claimed is:

1. Simultaneous multiple weighing inventory system, which comprises:
    a plurality of weighing platforms, each of said platforms being supported on the piston of a fluid-pressureoperated cylinder, all of said cylinders being supplied by a common source with fluid at gradually increasing pressures until the weight of and on each of said plurality of weighing platforms is individually and independently balanced and lifted by the fluid pressure; and
    means for registering the pressure level at which each of said plurality of weighing platforms is balanced, and for converting, calculating and reporting the resulting count of like objects positioned on each of said platforms.

2. Simultaneous multiple weighing inventory system, which comprises:
    a plurality of fluid-pressure-operated cylinders, each of said cylinders having a piston with its piston rod extending vertically upwardly therefrom to support a weighing platform, each of said plurality of weighing platforms having a homogeneous group of objects-to-be-inventoried positioned thereon;
    pumping means for impelling fluid under pressure;
    supply conduit means common to all of said plurality of cylinders for delivering fluid at uniformly increasing pressure from said pump to all of said plurality of cylinders simultaneously;
    a plurality of pressure relief means, each for permitting the fluid pressure in the corresponding one of said plurality of cylinders to be reduced, each of said plurality of pressure relief means being actuated when the increasing fluid pressure has balanced the force of the total weight being supported on the piston of said corresponding one of said plurality of cylinders;
    pressure value measuring means for determining individually the pressure at which each of said plurality of pressure relief means is actuated; and
    computer means for receiving the individual balancing pressure values from said pressure value measuring means, said computer means being programmed to control the operations of said plurality of fluid pressure cylinders, said pumping means and said pressure value measuring means, said computer means being capable of combining the individual balancing pressure values with previously stored data to calculate, store, display and print out an accurate count of the group of like objects positioned on each of said plurality of weighing platforms.

3. The simultaneous multiple weighing inventory system of claim 2, further comprising means for rotating all of said pistons simultaneously, during the time that said pistons are subjected to increasing fluid pressure, to ensure smooth operation of said pistons.

4. The inventory system of claim 2, wherein each of said plurality of pressure relief means comprises each of said plurality of cylinder pistons having a bore for fluid passage therethrough, said bore being blocked from communication with the corresponding cylinder outlet until brought into registry therewith by the movement of the piston of said corresponding cylinder when said piston is subjected to weight-balancing fluid pressure.

5. The inventory system of claim 4, further comprising each of said cylinder outlets having a conduit with pressure-sensitive signalling means mounted therein, said signalling means being actuated by fluid pressure impinging thereon, said fluid pressure having been released from the corresponding one of said plurality of cylinders, said signalling means thereby notifying said computer means that balancing pressure on the corresponding one of said plurality of cylinder pistons has been reached.

6. The inventory system of claim 5, wherein said computer means, when signalled by each of said signalling means, is programmed to deactivate and isolate the corresponding one of said plurality of cylinders, and to elicit from said pressure value measuring means the corresponding balancing pressure.

* * * * *